(12) United States Patent
Merchak et al.

(10) Patent No.: US 10,233,308 B2
(45) Date of Patent: Mar. 19, 2019

(54) COLORED FLUIDS FOR DISPLAY DEVICES

(71) Applicant: Sun Chemical Corporation, Parsippany, NJ (US)

(72) Inventors: Paul Andrew Merchak, Loveland, OH (US); Norman Wayne Smith, Cincinnati, OH (US)

(73) Assignee: Sun Chemical Corporation, Parsippany, NJ (US)

( * ) Notice: Subject to any disclaimer, the term of this patent is extended or adjusted under 35 U.S.C. 154(b) by 177 days.

(21) Appl. No.: 15/051,123

(22) Filed: Feb. 23, 2016

(65) Prior Publication Data

US 2016/0168360 A1 Jun. 16, 2016

Related U.S. Application Data

(63) Continuation of application No. PCT/US2014/052673, filed on Aug. 26, 2014.

(60) Provisional application No. 61/872,072, filed on Aug. 30, 2013.

(51) Int. Cl.
| | |
|---|---|
| C08K 5/56 | (2006.01) |
| C09B 67/22 | (2006.01) |
| C09B 67/46 | (2006.01) |
| C09B 69/10 | (2006.01) |

(52) U.S. Cl.
CPC ............. *C08K 5/56* (2013.01); *C09B 67/009* (2013.01); *C09B 67/0035* (2013.01); *C09B 69/108* (2013.01)

(58) Field of Classification Search
CPC .................................... C08K 5/56; C09K 9/00
USPC .......... 524/612, 105; 252/500; 359/296, 290
See application file for complete search history.

(56) References Cited

U.S. PATENT DOCUMENTS

| | | | | |
|---|---|---|---|---|
| 3,912,677 A | * | 10/1975 | Baker | C08F 8/00 523/205 |
| 6,918,958 B2 | * | 7/2005 | Weber | C09B 67/0033 106/31.75 |
| 7,576,146 B2 | | 8/2009 | Huber et al. | |
| 8,179,590 B1 | | 5/2012 | Mabeck et al. | |
| 8,331,014 B2 | | 12/2012 | Liu et al. | |
| 8,358,322 B2 | | 1/2013 | Yeo et al. | |
| 8,514,481 B2 | | 8/2013 | Yeo et al. | |
| 8,520,286 B2 | | 8/2013 | Clapp et al. | |
| 8,540,359 B2 | | 9/2013 | Zhou et al. | |
| 8,652,245 B2 | | 2/2014 | Liu et al. | |
| 8,743,451 B2 | | 6/2014 | Farrand et al. | |
| 8,759,441 B2 | * | 6/2014 | Loccufier | C09B 67/0063 106/31.6 |
| 8,896,906 B2 | | 11/2014 | Zhou et al. | |
| 8,927,648 B2 | * | 1/2015 | Zhang | C08G 63/91 523/200 |
| 2010/0044652 A1 | | 2/2010 | Kawaharada et al. | |
| 2012/0001842 A1 | | 1/2012 | Stellbrink | |
| 2012/0118198 A1 | | 5/2012 | Zhou et al. | |
| 2012/0190782 A1 | | 7/2012 | Zhou et al. | |
| 2012/0307347 A1 | * | 12/2012 | Clapp | G02B 26/005 359/296 |

FOREIGN PATENT DOCUMENTS

| | | |
|---|---|---|
| CN | 101542327 A | 9/2009 |
| GB | 1 350 284 A | 4/1974 |
| JP | 2002-121420 A | 4/2002 |
| JP | 2011-510336 A | 3/2011 |
| WO | WO 2005/071479 A1 | 8/2005 |
| WO | WO 2009/100803 A2 | 8/2009 |
| WO | WO 2010/089057 A2 | 8/2010 |
| WO | WO 2010/089058 A1 | 8/2010 |
| WO | WO 2010/089059 A1 | 8/2010 |
| WO | WO 2010/089060 A2 | 8/2010 |
| WO | WO 2011/075720 A1 | 6/2011 |
| WO | WO 2011/154104 A1 | 12/2011 |
| WO | WO 2012/102802 A1 | 8/2012 |
| WO | WO 2013/047860 A1 | 4/2013 |
| WO | WO 2013/111873 A1 | 5/2015 |

OTHER PUBLICATIONS

18th International Display Workshops 2011 (IDW '11), Nagoya, Japan, Dec. 7-9, 2011, vols. 1-3, Society for Information Display, 26 pgs.
Heikenfeld, J., et al., "Review Paper: A critical review of the present and future prospects for electronic paper," Journal of the SID, 19(2):129-156, 28 pgs.
Koch, T., et al., "Novel flexible reflective color media with electronic inks," Journal of Information Display, Mar. 2011, 12(1):5-10, 6 pgs.
Liu, Q., et al., "Full Color Reflective Electronic Media," HP Laboratories, HPL-2011-97, Hewlett-Packard Development Company, L.P., Jul. 6, 2011, 5 pgs.
Zhou, Z-L, et al., "Development of Bistable Electronic Inks for Reflective Color Media," HP Laboratories, HPL-2012-142, Hewlett-Packard Development Company, L.P., Jun. 28, 2012, 5 pgs.
Zhou, Z-L, et al., "Low Power Reflective Display with Print-Like Color via Novel Electronic Inks," HP Laboratories, HPL-2011-67, Hewlett-Packard Development Company, L.P., May 21, 2011, 17 pgs.

* cited by examiner

*Primary Examiner* — Jane L Stanley
(74) *Attorney, Agent, or Firm* — Frost Brown Todd LLC

(57) ABSTRACT

A colored fluid for use in a display device comprises at least one first pigment, at least one non-polar solvent, and at least one polymeric dispersant comprising the formula:

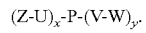

P is a residue of a second pigment, which may be the same or different from the first pigment. Each Z is independently a non-polar polymer. Each U and V are various linking groups. Each W is independently selected from H, OH, SH, alkyl, aryl, alkylaryl, ammonium, alkylammonium, arylammonium, alkali metal, and alkaline earth metal. Each V-W bond is a covalent or ionic bond, x is an integer greater than or equal to 1, and y is an integer greater than or equal to 1, and wherein for the colored fluid, at least one polymeric dispersant comprises an ionic (V-W) moiety.

16 Claims, No Drawings

COLORED FLUIDS FOR DISPLAY DEVICES

CROSS REFERENCE TO RELATED APPLICATIONS

The present application hereby claims the benefit of PCT/US2014/052673, filed on Aug. 26, 2014, which claimed the benefit of the provisional patent application of the same title, Ser. No. 61/872,072, filed on Aug. 30, 2013, the disclosure of which is herein incorporated by reference in its entirety.

BACKGROUND

Colored fluids may be used in display devices, in particular a display device that operates by electrokinetic, electrofluidic, electrophoretic, or electrowetting manipulation of the fluid to form an image. A display device with a better more stable colored fluid will last longer. An improvement in the dispersion stability will create a more stable colored fluid and consequently a longer functioning device.

BRIEF SUMMARY

A colored fluid for use in a display device comprises at least one first pigment, at least one non-polar solvent, and at least one polymeric dispersant comprising the formula: $(Z-U)_x-P-(V-W)_y$. P is a residue of a second pigment, which may be the same or different from the first pigment. Each Z is independently a non-polar polymer. Each U and V are independently selected from R, RC(O)O, ROC(O), RC(O)NR$_1$, RNR$_1$C(O), RSO$_2$NR$_1$, RSO$_3$, ROSO$_3$, RSO$_2$, RO, RS, RNR$_1$, =N—, RNHC(O)NR$_1$, RNHC(O)O, ROC(O)NH, RC(O)OCH$_2$CH(OH)CH$_2$, ROCH$_2$CH(OH)CH$_2$, RNR$_1$CH$_2$CH(OH)CH$_2$, RPO(OR$_1$)O, ROPO(OR$_1$)O, and anionic forms thereof. Where R is independently selected from a single bond, alkyl, aryl, alkylaryl, or a heterocycle, and each R$_1$ is independently selected from H, alkyl, aryl, or alkylaryl, provided that there is at least one V-W that is not a single bonded hydrogen. Each W is independently selected from H, OH, SH, alkyl, aryl, alkylaryl, ammonium, alkylammonium, arylammonium, alkali metal, and alkaline earth metal. Each V-W bond is a covalent or ionic bond, x is an integer greater than or equal to 1, and y is an integer greater than or equal to 1, and wherein for the colored fluid, at least one polymeric dispersant comprises an ionic (V-W) moiety. U and V are linking moieties.

The process for preparing the colored fluid comprises the steps of providing a first pigment, providing a polymeric dispersant, and performing a dispersion process to generate the colored fluid as a pigment dispersion from the first pigment, the polymeric dispersant, and a non-polar solvent.

These and other objects and advantages shall be made apparent from the accompanying drawings and the description thereof.

DETAILED DESCRIPTION

The colored fluid comprises at least one first pigment, at least one non-polar solvent, and at least one polymeric dispersant. The polymeric dispersant comprises a residue of a second pigment attached to a non-polar polymer and an additional substituent. At least some of the additional substituent in the polymeric dispersant is ionic. The colored fluid may be chromatic or achromatic (i.e., capable of producing a white to gray to black transition when employed as a component of a suitable electronic display device) in color. The colored fluids may be employed as a component for further elaboration for use in imaging and display devices, including, but not limited to: imaging and display devices employing electrokinetic (which includes electrophoretic), electrowetting and electrofluidic principles of operation.

"Colored" is herein defined as chromatic (a color or combination of colors within the visible spectrum) or achromatic (black, white or gray) color.

A pigment is formed by an association of colorant molecules forming a substantially insoluble particle. A pigment residue is a colorant molecule used to produce a dispersant. The pigment residue is substituted, and the substitution may replace other substitutions on the colorant molecule.

In some embodiments, the colored fluid for use in a display device comprises at least one first pigment, at least one non-polar solvent, and at least one polymeric dispersant comprising the formula: $(Z-U)_x-P-(V-W)_y$. P is a residue of a second pigment, which may be the same or different from the first pigment. Each Z is independently a non-polar polymer. Each U and V are independently selected from R, RC(O)O, ROC(O), RC(O)NR$_1$, RNR$_1$C(O), RSO$_2$NR$_1$, RSO$_3$, ROSO$_3$, RSO$_2$, RO, RS, RNR$_1$, =N—, RNHC(O) NR$_1$, RNHC(O)O, ROC(O)NH, RC(O)OCH$_2$CH(OH)CH$_2$, ROCH$_2$CH(OH)CH$_2$, RNR$_1$CH$_2$CH(OH)CH$_2$, RPO(OR$_1$) O, ROPO(OR$_1$)O, and anionic forms thereof. Where R is independently selected from a single bond, alkyl, aryl, alkylaryl, or a heterocycle, and each R$_1$ is independently selected from H, alkyl, aryl, or alkylaryl, provided that there is at least one V-W that is not a single bonded hydrogen. Each W is independently selected from H, OH, SH, alkyl, aryl, alkylaryl, ammonium, alkylammonium, arylammonium, alkali metal, and alkaline earth metal. Each V-W bond is a covalent or ionic bond, x is an integer greater than or equal to 1, and y is an integer greater than or equal to 1, and wherein for the colored fluid, at least one polymeric dispersant comprises an ionic (V-W) moiety. U and V are linking moieties.

In some embodiments, the first pigment is a substantially insoluble particle that includes substantially only a single type of molecule structure with these stacked repeated together to form the particle. In some embodiments, the first pigment contains two or more molecular structures as mixtures of individual pigment types, solid solutions or combinations of these.

In some embodiments, the first pigment is selected from azo or azo condensed compounds, metal complexes, benzimidazolones, azomethines, cyanines, azacarbocyanines, enamines, hemicyanines, streptocyanines, styryls, zeromethines, mono-, di-, tri-, and tetraazamethine, carotenoids, diarylmethanes, triarylmethanes, xanthenes, thioxanthenes, flavonoids, stilbenes, coumarins, acridines, fluorenes, fluorones, benzodifuranones, formazans, pyrazoles, thiazoles, azines, diazines, oxazines, dioxazines, triphenodioxazines, phenazines, thiazines, oxazones, hydroquinones, naphthaquinones, anthraquinones, rhodamines, phthalocyanines, neutrocyanines, diazahemicyanines, porphyrins, perinones, perylenes, pyronins, diketopyrrolopyrroles, indigo, indigoids, thioindigo, indophenols, naphthalimides, isoindolines, isoindolinones, iminoisoindolines, iminoisoindolinones, quinacridones, flavanthrones, indanthrones, anthrapyrimidines, quinophthalones, isoviolanthrones, pyranthrones, and any combinations thereof. In some embodiments, the first pigment is selected from any acid, direct, reactive, mordant, solvent, natural, disperse, basic (cationic), sulfur, fluorescent, food or vat dye, or optical brightener. In some embodiments, the first pigment is a copper phthalocyanine selected from C.I. Pigment Blue 15:3 and C. I. Pigment Blue 15:4.

In some embodiments, the first pigment particles have an average size (D50) from dynamic light scattering analysis ranging from about 10 nm to about 1 µm, such as from about 10 nm to about 300 nm, from about 50 nm to about 300 nm, from about 50 nm to about 700 nm, and from about 50 nm to about 1 µm.

In some embodiments, the first pigment content in the non-polar fluid is in the range from about 0.1 to about 50 weight %, based on the total weight of the pigmented colored fluid, such as from about 0.5 to about 40 weight %, or from about 1 to about 20 weight %, based on the total weight of the fluid.

The non-polar solvent may be any liquid or combination of two or more liquids. Examples of non-polar solvents include, but are not limited to, non-substituted linear and branched alkanes and their derivatives, for example, halogenated alkanes, substituted and unsubstituted aromatic hydrocarbons and partially hydrogenated aromatic hydrocarbons, fatty alcohols and carboxylic acids, esters, and amides, or any mixtures thereof. The non-polar solvent is a liquid having a dielectric constant k of 20 or less.

In some embodiments, the dynamic viscosity of the non-polar solvent is less than about 2000 cP at 25° C., such as from about 0.1 cP to about 2000 cP at 25° C. and about 0.1 cP to about 500 cP at 25° C.

The dispersant comprises the formula:

$$(Z-U)_x\text{-}P\text{-}(V\text{-}W)_y \quad (1)$$

P is a residue of a second pigment. Each Z is independently a non-polar polymer. Each U and V are independently selected from R, RC(O)O, ROC(O), RC(O)NR$_1$, RNR$_1$C(O), RSO$_2$NR$_1$, RSO$_3$, ROSO$_3$, RSO$_2$, RO, RS, RNR$_1$, =N—, RNHC(O)NR$_1$, RNHC(O)O, ROC(O)NH, RC(O)OCH$_2$CH(OH)CH$_2$, ROCH$_2$CH(OH)CH$_2$, RNR$_1$CH$_2$CH(OH)CH$_2$, RPO(OR$_1$)O, ROPO(OR$_1$)O, and anionic forms thereof. Each R is independently selected from a single bond, alkyl, aryl, alkylaryl, or a heterocycle, and each R$_1$ is independently selected from H, alkyl, aryl, or alkylaryl. At least one V-W is not a single bonded hydrogen. Each W is independently selected from H, OH, SH, alkyl, aryl, alkylaryl, ammonium, alkylammonium, arylammonium, alkali metal, and alkaline earth metal. Each V-W bond is a covalent or ionic bond, x is an integer greater than or equal to 1, and y is an integer greater than or equal to 1, and wherein for the colored fluid, at least one polymeric dispersant comprises an ionic (V-W) moiety. U and V are linking moieties. In some embodiments, x is greater than or equal to 1, such as x is 1-5, x is 1-4, x is 1-3, x is 1-2, or x is 1. In some embodiments, y is greater than or equal to 1, such as y is 1-5, y is 1-4, y is 1-3, y is 1-2, or y is 1. In some embodiments, x and y may range in any combination from 1-5.

In some embodiments, the residue of a second pigment is selected from azo or azo condensed compounds, metal complexes, benzimidazolones, azomethines, cyanines, azacarbocyanines, enamines, hemicyanines, streptocyanines, styryls, zeromethines, mono-, di-, tri-, and tetraazamethine, carotenoids, diarylmethanes, triarylmethanes, xanthenes, thioxanthenes, flavonoids, stilbenes, coumarins, acridines, fluorenes, fluorones, benzodifuranones, formazans, pyrazoles, thiazoles, azines, diazines, oxazines, dioxazines, triphenodioxazines, phenazines, thiazins, oxazones, hydroquinones, naphthaquinones, anthraquinones, rhodamines, phthalocyanines, neutrocyanines, diazahemicyanines, porphyrins, perinones, perylenes, pyronins, diketopyrrolopyrroles, indigo, indigoids, thioindigo, indophenols, naphthalimides, isoindolines, isoindolinones, iminoisoindolines, iminoisoindolinones, quinacridones, flavanthrones, indanthrones, anthrapyrimidines, quinophthalones, isoviolanthrones, pyranthrones, and any combinations thereof. In some embodiments, the residue of a second pigment is selected from a residue of any acid, direct, reactive, mordant, solvent, natural, disperse, basic (cationic), sulfur, fluorescent, food or vat dye, or optical brightener. In some embodiments, the second pigment comprises a copper phthalocyanine.

The W moiety is attached to V by a covalent or an ionic bond. The W moiety is selected from H, OH, SH, alkyl, aryl, alkylaryl, ammonium, alkylammonium, arylammonium, alkali metal (such as lithium, sodium and potassium), and alkaline earth metal (such as beryllium, magnesium, calcium, strontium, and barium); provided that at least one V-W is not a single bonded hydrogen.

The colored fluid comprises at least one polymeric dispersant that comprises an ionic (V-W) moiety. An ionic moiety is one which can be ionic, but is not necessarily ionic at every pH. Depending on the pH and other conditioning factors during the preparation of the dispersant, pigment, and final colored fluid, the V-W moiety may be in the neutral form (i.e., acid forms (SO$_3$H) and (COOH)), ionic form (i.e., salt forms (SO$_3^-$Na$^+$), (SO$_3^-$K$^+$), and (COO$^-$Na$^+$)) or a combination of neutral and ionic forms. In some embodiments, the V-W moiety contains anionic, cationic, or zwitterionic groups. Examples of anionic groups include, but are not limited to, sulfonic, phosphonic, and carboxylic. Examples of cationic groups include, but are not limited to, ammonium, phosphonium, and sulfonium. In some embodiments, the V-W moiety is in the acid form, such as, but not limited to, carboxylic acid, sulfonic acid, phosphonic acid. While the V-W moiety may be in the acid form, it is still considered an ionic moiety because a change in the pH or other condition could render it ionic. In some embodiments, the first pigment is charged as a result of the chargeable pendant V-W moieties on the dispersant that are bounded to the pigment particles.

The residue of a second pigment may be attached to more than one V-W moiety. When there is more than one V-W moiety attached to the residue of a second pigment, they may be identical or different V-W moieties. In some embodiments, the polymeric dispersant may additionally comprise the residue of a second pigment without a V-W moiety attached to it with a formula of (Z-U)$_x$-P. In some embodiments, the colored fluid comprises more than one dispersant and the average x for the mixture is from about 1.0 to about 2.8, and y ranges from greater than 0 to about 1.8

In some embodiments, the non-polar polymer Z is selected from polyvinyl, polyvinylidene, polydiene, polyalkylene, polyanhydride, polyalkyleneglycol, polyalcohol, polyester, polyepoxy, polyurethane, polyamine, polyimine, polyamide, polyimide, polyuria, polycarbonate, polyacetal, polysulfone, polyaldehyde, polyketone, or any random, block or grafted co-polymer thereof. In some embodiments, the non-polar polymer Z is a polyalkylene, such as polyisobutylene. In some embodiments, the non-polar polymer Z has a molecular weight from about 400 to about 100,000, such as from about 400 to about 5,000, about 400 to about 20,000, about 5,000 to about 20,000, about 5,000 to about 100,000, or about 20,000 to about 100,000.

Reactive monomers and oligomers suitable for synthesis of the dispersant can contain one or more vinyl, hydroxyl, carboxyl, anhydride, halogen, mercapto, alkoxy, epoxy, isocyanato, amide, imide, sulfonic, phosphonic, primary, secondary, tertiary or quaternary amino groups, or any combination thereof.

In some embodiments, the dispersant is purified to provide overall better fluid performance and more desirable long term device performance. Any appropriate techniques are suitable for purification of the dispersant. Examples include, but are not limited to, chromatographic separation, precipitation from solution by solvent replacement, extraction, sublimation, centrifugation, distillation, re-crystallization, fractional crystallization, ultrafiltration, reverse osmosis, aqueous washing, solvent washing or any combination thereof.

The process for preparing the colored fluid comprises the steps of providing a first pigment, providing a polymeric dispersant, and performing a dispersion process to generate the colored fluid as a pigment dispersion from the first pigment, the polymeric dispersant, and a non-polar solvent. The dispersion process is the mixing of the pigment with the polymeric dispersant to stabilize the pigment. The dispersion process may additionally include a step of media milling to break up aggregated pigment particles. In some embodiments, the process for preparing the colored fluid additionally comprises the step of performing a pigmentation process to prepare the first pigment. The pigmentation process is the comminution, kneading, or attrition of a crude or pigment of incorrect particle size or properties in the presence of a water soluble solvent and inorganic salt to form a magma. The solvent and inorganic salt in the magma are washed away to produce a purified pigment.

The dispersant may be added before, during, or after any point in the pigment preparation or dispersion steps. When added to the pigment before, during, or after the pigmentation process, purification of the dispersant may occur during the purification and isolation of the pigment. An example of the dispersant added prior to the pigmentation process would include addition during the preparation of a pigment crude, which will be further processed to form the final pigment form. Examples of dispersant addition during the pigmentation process would include addition during a colorant synthesis that results directly in the pigment, a solvent treatment process, or an attrition process (i.e., a salt attrition process known to those skilled in the art). The process of salt attrition is exemplified in the examples below. Examples of dispersant addition to the pigment after the pigmentation process may include addition to a slurry post-pigmentation process, dry-blending with the pigment, or addition during the dispersion process.

In some embodiments, the residue of the second pigment comprises additional functional groups. Non-limiting examples of these functional groups are alkyl, aryl, alkylaryl, halogen, nitro, nitroso, cyano, thio, amino, alkylamino, hydroxyl, carboxylic, aldehyde, anhydride, amide, sulfonamide, salts of carboxylic and sulfonic acids, or any combination thereof.

In some embodiments, the Z-U moiety acts as a steric stabilizing pendant group which is covalently bonded to the residue of a second pigment. In some embodiments, for example, the Z-U steric stabilizing pendant group is $$\left[ SO_2NH \diagup\!\!\!\diagdown\!\!\!\left(\diagup\!\!\!\diagdown\right)_n H \right]_x,$$

where x ranges from about 1 to about 4 and the average n is about 16.5. The dispersant may comprise a mixture of the above structure, where the average x for the mixture is from about 1.0 to about 2.8, and n ranges from about 10 to about 20, such as n being an average of about 16.5. In some embodiments, P comprises a copper phthalocyanine and Z comprises a polyisobutylene polymer. In some embodiments, P comprises a copper phthalocyanine, the (V-W) moiety comprises a sulfonic acid moiety, and Z comprises a polyisobutylene polymer. In some embodiments, P comprises a copper phthalocyanine, the (V-W) moiety comprises a free sulfonic acid moiety, and Z comprises a polyisobutylene polymer. A sulfonic acid moiety is one that may be further substituted, such as $RSO_3W$, where W is not H. A free sulfonic acid moiety is $RSO_3H$, which may be deprotonated under certain pH conditions.

In some embodiments, the dispersant comprises the structure:

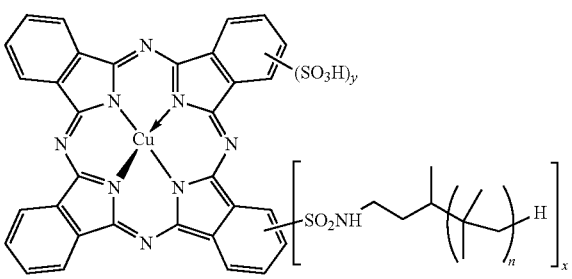

where x ranges from about 1 to about 4, y ranges from 1 to 4, and n ranges from about 10 to about 20, such as n being an average of about 16.5. The dispersant may comprise a mixture of the above structure, where the average x for the mixture is from about 1.0 to about 2.8, and y ranges from greater than 0 to about 1.8, and n ranges from about 10 to about 20, such as n being an average of about 16.5. In some embodiments, the colored fluids comprises this dispersant and the first pigment is a copper phthalocyanine selected from C.I. Pigment Blue 15:3, C. I. Pigment Blue 15:4, and combinations thereof.

The dispersant is dispersible in the non-polar solved of the colored fluid, and in any further elaboration or additional formulation of the colored fluid.

In some embodiments, the weight ratio of dispersant to first pigment in the colored fluid can range from about 1:4 to about 1:1.5.

In some embodiments, the first pigment contains modifiers and/or surface modifiers (known as crystal growth inhibitors, additives, surfactants, synergists, additives for electrical conductivity control, additives to control movement in an electrical field, dispersants, biocides, defoamers, and other functional additives known by those skilled in the art) to provide a performance enhancement and may be functionalized to provide either ionic functionality that may be anionic, cationic, amphoteric or any combination of these; non-ionic functionality, that may include, but is not limited to ether, ester, amide, and imide; or any combination of the ionic and non-ionic functionalities. These modifiers or surface modifiers may be added or synthesized during any stage of the colorant synthesis, pigmentation, isolation, drying, grinding, dispersion, or later formulation processing steps. These modifiers also include, but are not limited to, crystal growth inhibitors, additives, surfactants, synergists, additives for electrical conductivity control, additives to control movement in an electrical field, dispersants, biocides, defoamers, and other functional additives known by those skilled in the art.

While the present disclosure has illustrated by description several embodiments and while the illustrative embodiments have been described in considerable detail, it is not the intention of the applicant to restrict or in any way limit the scope of the appended claims to such detail. Additional advantages and modifications may readily appear to those skilled in the art.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "composed", "comprised" or variants thereof are used in either the detailed description or the claims, such terms are intended to be inclusive in a manner similar to the term "comprising."

EXAMPLES

In the following examples, the term "CuPc" is employed to indicate a copper phthalocyanine residue, which may be optionally substituted. The examples generally show an improvement in dispersion and colored fluid stability which results in a longer functioning device.

Dispersant I-XIII: Dispersant I process: To a 500 ml round-bottom flask was charged 224 ml of chlorosulfonic acid and 40.6 ml of thionyl chloride. To this mixture was charged 80 g of copper phthalocyanine crude, portionwise during a 20 minute period. The mixture was heated to 90° C. and held for about 8 hours. The mixture was cooled to 0° C. using an external ice bath and then it was slowly poured into 4 L of stirred ice water. The dark blue precipitate was filtered and washed with ice cold water until the pH of the filtrate was about 6.0 and the product was stored in a freezer until used to synthesize the dispersant. The product at this stage is a water-wet cake of copper phthalocyanine substituted with an average of 2.3 chlorosulfonyl substituents. To a chilled benchtop kneader was charged 195 g of the preceding chlorosulfonylated CuPc (active amount=38.7 g). While mixing, 115 g of Kerocom PIBA 03 (65% active, from BASF) was added over a period of 30 minutes. Dry ice was added as necessary to keep the mixture near 0° C. Sodium carbonate (10.7 g) was added and the mixture was allowed to continue mixing while allowing to warm gradually to ambient temperature. After several hours, the mixture was heated to 90° C. and water was removed by evaporation. To the mixture was added 41 g of Isopar L (from Exxon-Mobil) and the mixture was agitated until a homogeneous paste was obtained, then discharged from the kneader. Dispersants II-XIII were made analogously, varying the chlorosulfonation time as needed to achieve the desired level of substitution, and adjusting the amount of Kerocom PIBA 03 as needed.

Example 1

Copper phthalocyanine crude (obtained from Sun Chemical), finely powdered sodium chloride (containing about 2% $Ca_3(PO_4)_2$), and diethylene glycol were mixed in a ratio of 1:8:1.16 at a temperature of up to 120° C. for a period of 10 hours in a mix muller to produce a pigment containing magma.

Example 2

The product of example 1, water, and 30% aqueous HCl were stirred in a ratio of 1:6:0.6. The mixture was heated to 90° C. for one hour, then filtered while hot and the filter cake was washed with more water until the filtrate pH became neutral and its conductivity was the same as the wash water. The cake was then reslurried in deionized water (5 times the amount of dry equivalent) and stirred overnight. The slurry was filtered, washing with more deionized water until the conductivity of the filtrate was 4.5 micro Siemens. The cake was dried in an oven at 80° C. overnight to produce a dry pigment.

Example 3

Comparative

A mixture of 15.00 g of the product of example 2, 1.50 g of methanol repurified form of a dimethyl ditallow quaternary ammonium neutralized monosulfonated copper phthalocyanine synergist, 3 g of a polymeric hydroxylated stearamide and 130.50 g of Isopar®-L was made in an 8 oz glass jar. To this was added 75 g of 1 mm ceramic media. The mixture was shaken on a paint shaker for one hour. The ceramic media was removed and the resulting dispersion was filtered through a 1.2 micron filter.

Example 4

Comparative

A mixture of 15.00 g of the product of example 2, 1.50 g of non-repurified form of a dimethylditallow quaternary ammonium neutralized monosulfonated copper phthalocyanine, 3 g of a polymeric hydroxylated stearamide and 130.50 g of Isopar®-L was made in an 8 oz glass jar. To this was added 75 g of 1 mm ceramic media. The mixture was shaken on a paint shaker for one hour. The ceramic media was removed and the resulting dispersion was filtered through a 1.2 micron filter.

Example 5

Into a kneader were charged 25 g of Pigment Blue 15:3 (249-1284 from Sun Chemical), 0.5 g of phthalimidomethyl copper phthalocyanine, 250 g of salt (sodium chloride), 50 g of propylene glycol. This mixture was mixed for 6.5 hours, then 21 g of Dispersant I [$CuPc\text{-}(SO_3H)_{1.3}(SO_2NH\text{-poly-mer})_{1.0}$] with Magie oil 47 (solids content 60%) was added and the mixture was mixed for a further hour. The mixture was discharged and slurried in water and acid. The slurry was heated to 90° C. for an hour, then filtered, washed with water, then washed with deionized water and finally washed with isopropanol before it was dried in an oven. Yield=33.5 g A mixture of 17.30 g of the preceding material and 114 g of Isopar®-L and 66 g of 1 mm ceramic media was shaken on a paint shaker for 1 hr. The media was removed and the resulting dispersion was filtered through a 1.2 micron filter.

Example 6

A mixture of 220 g of the product of Example 1, 0.43 g of phthalimidomethyl copper phthalocyanine, 11.42 g of Dispersant I (active content=60%), and 10 g of diethylene glycol was mixed in a lab kneader for 1 hr. The resulting mixture was slurried in water and HCl at 90° C. for 90 minutes. The slurry was then filtered, washed with tap water until the pH of the filtrate became neutral. The filter cake was reslurried in isopropanol at ambient temperature for 30 minutes, then filtered and washed with deionized water until the conductivity of the filtrate was 24 micro Siemens. The product was dried in an oven overnight.

A mixture of 17.30 g of the preceding material and 114 g of Isopar®-L and 66 g of 1 mm ceramic media was shaken on a paint shaker for 1 hr. The media was removed and the resulting dispersion was filtered through a 1.2 micron filter.

Example 7

A mixture of 220 g of the product of Example 1, 0.43 g of phthalimidomethyl copper phthalocyanine, 22.84 g of Dispersant I (active content=60%) and 10 g of diethylene glycol were mixed in a lab kneader for 1 hr. The resulting mixture was slurried in water and HCl at 90° C. for 90 minutes. The slurry was then filtered, washed with tap water until the pH of the filtrate became neutral. The filter cake was reslurried in isopropanol at ambient temperature for 30 minutes, then filtered and washed with deionized water until the conductivity of the filtrate was 24 micro Siemens. The product was dried in an oven overnight.

A mixture of 17.30 g of the preceding material and 114 g of Isopar®-L and 66 g of 1 mm ceramic media was shaken on a paint shaker for 1 hr. The media was removed and the resulting dispersion was filtered through a 1.2 micron filter.

Example 8

A mixture of 220 g of the product of Example 1, 0.43 g of phthalimidomethyl copper phthalocyanine, 17.13 g of Dispersant I (active content=60%), and 10 g of diethylene glycol was mixed in a lab kneader for 1 hr. The resulting mixture was slurried in water and HCl at 90° C. for 90 minutes. The slurry was then filtered, washed with tap water until the pH of the filtrate became neutral. The filter cake was reslurried in isopropanol at ambient temperature for 30 minutes, then filtered and washed with deionized water until the conductivity of the filtrate was 24 micro Siemens. The product was dried in an oven overnight.

A mixture of 17.30 g of the preceding material and 114 g of Isopar®-L and 66 g of 1 mm ceramic media was shaken on a paint shaker for 1 hr. The media was removed and the resulting dispersion was filtered through a 1.2 micron filter.

Example 9

Example 8 was repeated, with the exception that the initial Isopar®-L dispersion was milled for two hours using a Silverson L5M-A rotor-stator mixer in the presence of 50 micron polymethyl methacrylate media for two hours. Then the resulting dispersion was filtered through a 1.2 micron filter.

Example 10

A mixture of 220 g of the product of Example 1, 0.43 g of phthalimidomethyl copper phthalocyanine, 17.13 g of Dispersant I (active content=60%), and 10 g of diethylene glycol were mixed in a lab kneader for 1 hr. The resulting mixture was slurried in water and HCl at 90° C. for 90 minutes. The slurry was then filtered, washed with tap water until the pH of the filtrate became neutral. The filter cake was reslurried in isopropanol at ambient temperature for 30 minutes, then filtered and washed with deionized water until the conductivity of the filtrate was 24 micro Siemens. The cake was then reslurried in distilled water having a conductivity of 4 micro Siemens, filtered and washed with distilled water. The product was dried in an oven overnight.

A mixture of 51.31 g of the preceding product, 350 g of Isopar®-L and 194.5 g of 1 mm ceramic media was shaken in an 8 oz jar on a paint shaker for one hour. The media were removed and the resulting dispersion was filtered through a 1.2 micron filter.

Example 11

The procedure described in example 10 was repeated, except that after removing the media from the dispersion it was milled using a Silverson L5M-A rotor-stator mixer in the presence of 50 micron polymethyl methacrylate media for two hours. Then the resulting dispersion was filtered through a 1.2 micron filter.

Example 12

A mixture of 21.0 g of copper phthalocyanine pigment, 174 g of salt, 28.3 g of diethylene glycol, and 0.43 g of phthalimidomethyl copperphthalocyanine was mixed in a laboratory kneader for one hour at ambient temperature. To this mixture was added 17.13 g of Dispersant I (60% active) and the mixture was kneaded for 30 minutes. The mixture was slurried in 2500 ml of tap water containing 25 g of 30% HCl and stirred at 90° C. for 1 hour. The slurry was filtered, washing with warm tap water until the pH of the filtrate became neutral and its conductivity was the same as the wash water. The mixture slurried in 1 L of isopropanol for one hour, then filtered and washed with isopropanol. The material was then reslurried in deionized water, followed by filtration and washing until the conductivity of the filtrate was <10 micro Siemens. The material was further slurried in distilled water (4 micro Siemens) and filtered and dried in a vacuum oven at 100° C. overnight.

A sample of above material 49.13 g, was combined with 335.16 g of Isopar®-L and 186 g of 1 mm ceramic media. The mixture was shaken for one hour on a paint shaker. The media was removed and the resulting dispersion was filtered through a 1.2 micron filter.

Example 13

The procedure described in example 12 was repeated with the exception that after removing the ceramic media from the dispersion it was milled using a Silverson L5M-A rotor-stator mixer in the presence of 50 micron polymethyl methacrylate media for two hours. Then the resulting dispersion was filtered through a 1.2 micron filter.

Example 14

A mixture of 220 g of the product of Example 1, 0.43 g of phthalimidomethyl copper phthalocyanine, 17.13 g of Dispersant I (active content=60%), and 10 g of diethylene glycol was mixed in a lab kneader for 1 hr. This procedure was carried out 10 times and the products were combined. The resulting mixture was slurried in water and HCl at 90° C. for 90 minutes. The slurry was then filtered, washed with tap water until the pH of the filtrate became neutral. The filter cake was reslurried in isopropanol at ambient temperature for 30 minutes, then filtered and washed with deionized water until the conductivity of the filtrate was 24 micro Siemens. The product was dried in an oven overnight. Three identical batches, comprising 50 g of the preceding dry color, 329 g of Isopar®-L and 189 g of 1 mm ceramic media was shaken on a paint shaker for one hour. The media was removed and the combined dispersions were filtered through a 1.0 micron cartridge filter.

General Procedure for Making Dispersions in Examples 15-24:

Into a lab kneader were charged 220 g of the product of example 1, 0.43 g of phthalimidomethyl phthalocyanine (except example 24), a sufficient quantity of diethylene glycol to achieve desired consistency and 10.27 g of a dispersant (except 7.5 g for examples 15-16) having the descriptions given in Table I. The mixture was blended for one hour and then discharged. The process was repeated and the combined products were mixed with 2 L of isopropanol until a smooth slurry was obtained. The slurry was then filtered and washed with an additional 2 L of isopropanol. The wet filter cake was slurried in 2.5 L of water and 25 g of 36.5% HCl at 90° C. for one hour. The slurry was filtered and washed with additional tap water until the pH of the filtrate became neutral and the conductivity matched that of the wash water, then washed with deionized water. The product was reslurried in deionized water and then filtered and washed until the conductivity of the filtrates were the same as the deionized wash water. The product was then dried in a vacuum oven overnight at 80° C.

The dried material, 50 g, was combined with 329 g of Isopar®-L and 189 g of 1 mm ceramic media and shaken for 1 hr on a paint shaker. The media was removed and the resulting dispersion was filtered through a 1.0 micron cartridge filter.

TABLE I

Dispersant Structure $CuPc-(SO_3H)_y(SO_2NH-polymer)_x$

| Example | Dispersant | Average y | Average x |
|---|---|---|---|
| 15 | II | 0.26 | 1.0 |
| 16 (Comparative) | III | 0 | 1.0 |
| 17 | IV | 0.37 | 1.0 |
| 18 (Comparative) | V | 0 | 1.37 |
| 19 | VI | 0.18 | 1.19 |
| 20 | VII | 0.2 | 1.0 |
| 21 | VIII | 1.2 | 1.0 |
| 22 | IX | 0.6 | 1.6 |
| 23 (Comparative) | X | 0 | 2.2 |
| 24 | I | 1.3 | 1.0 |

Example 25

A mixture of 220 g of the product of Example 1, 0.43 g of phthalimidomethyl phthalocyanine, 8.55 g (60% active) of Dispersant I, and 7.45 g of Dispersant VI (68.78% active) [$CuPc-(CO_2H)_{1.3}(CONH-polymer)_{1.0}$] was mixed in a laboratory kneader for one hour. The resulting mixture was slurried in 1 L of isopropanol and blended with an IKA T25 rotor stator mixer for 30 minutes. The slurry was filtered, washing with 1 L isopropanol. The cake was reslurried in tap water containing 25 g of 36.5% HCl at 90° C. for 1 hr, then filtered and washed with tap water until the pH of the filtrates became neutral. The cake was reslurried by stirring in deionized water for one hour, then filtering, washing with additional deionized water until the conductivity of the filtrates became equal to the deionized washing water. The product was oven dried.

The above dried material, 20 g, was mixed with 114 g of Isopar®-L and 70 g of 1 mm ceramic media. The mixture was mixed for one hour on a paint shaker. The media was removed. The entire process of this example was repeated and the combined dispersions were filtered through a 1.0 micron cartridge filter.

General Procedure for Examples 26-28

Into a lab kneader were charged 220 g of the product of example 1, 0.43 g of phthalimidomethyl phthalocyanine, a sufficient quantity of diethylene glycol to achieve desired consistency and 10.27 g of an dispersant having the descriptions given in the table below. The mixture was blended for one hour and then discharged. The process was repeated and the combined products were mixed with 2 L of isopropanol until a smooth slurry was obtained. The slurry was then filtered and washed with an additional 2 L of isopropanol. The wet filter cake was slurried in 2.5 L of water and 25 g of 36.5% HCl at 90° C. for one hour. The slurry was filtered and washed with additional tap water until the pH of the filtrate became neutral and the conductivity matched that of the wash water, then washed with deionized water. The product was reslurried in deionized water and then filtered and washed until the conductivity of the filtrates were the same as the deionized wash water. The product was then dried in a vacuum oven overnight at 80° C.

The dried material, 50 g, was combined with 285 g of Isopar®-L and 167 g of 1 mm ceramic media and shaken for 1 hr on a paint shaker. The media was removed and the resulting dispersion was filtered through a 1.0 micron cartridge filter.

TABLE II

Dispersant Structure $CuPc-(SO_3H)_y(SO_2NH-polymer)_x$

| Example | Dispersant | Average y | Average x |
|---|---|---|---|
| 26 | XI | 1.8 | 1.0 |
| 27 | XII | 0.9 | 1.9 |
| 28 (Comparative) | XIII | 0 | 2.8 |

Magenta Example 1

Dichlorosulfonylated Quinacridone

Crude C.I. Pigment Violet 19 (obtained from Sun Chemical) (80 g) was charged to a mixture of 210 ml of chlorosulfonic acid and 40.6 ml of thionyl chloride at 22° C. during a period of 35 minutes. During the addition, the temperature rose to 85° C. The temperature was maintained at 85° C. for 90 minutes and then the mixture was poured carefully into 3 L of ice water. The slurry was filtered and washed with ice cold water until the pH of the filtrate was about 6.0 and the product was stored in a freezer until used to synthesize the dispersant.

Magenta Example 2

1.5 Substituted Sulfonamide Dispersant

To a pre-chilled (with dry ice) lab kneader was charged 130 g of the product of Magenta Example 1. The material was agitated and kept <0° C. by adding more dry ice as necessary. 245.2 g of Kerocom PIBA 03 (65% active, from BASF) was gradually added during 30 minutes, and then 14.97 g of sodium carbonate was added. The mixture was allowed to continue mixing for 12 hours while gradually warming on its own. The mixture was heated to 90° C., allowing water and oil from PIBA to distill under vacuum. Yield was 218.2 g of dispersant.

Magenta Example 3

C.I. Pigment Red 122 Dispersion Using 1.5 Sulfonamide Dispersant

To a lab kneader was charged 200 g of finely powdered sodium chloride. While stirring, 63 g of diethylene glycol was charged. After the mixture came together, 20 g of C.I. Pigment Red 122 (228-0013 from Sun Chemical) was added to form a magma. When the mixture came together again, 10.85 g of the dispersant of Magenta Example 2 was added. The magma was allowed to continue mixing for 1 hour, and then the material was discharged. This process was repeated. The combined magmas were stirred in 2 L of isopropanol using an overhead stirrer and IKA T25 Ultraturrax rotor-stator mixer until the magma was fully dispersed. The slurry was filtered, washing with 2 L of additional isopropanol. The filter cake was reslurried in 2.5 L of tap water and 25 g of 36.5% HCl. The mixture was heated to 90° C. for 1 hour, then filtered, washing with 16 L of tap water. The cake was reslurried in deionized water, stirred for 1 hour, then filtered, washing with more deionized water until the conductivity of the filtrate was equal to that of the deionized wash water, then dried in a vacuum oven at 80° C. overnight. Yield was 49.6 g of dry magenta pigment containing dispersant.

45 grams of the 49.6 g of dry magenta pigment containing dispersant was mixed with 318 g of Isopar® L from ExxonMobil and 13.15 g of polymeric hydroxylated stearamide. 1900 g of 1 mm ceramic media was charged and the mixture was shaken for two hours on a paint shaker. The media was strained out with a sieve, and the dispersion was filtered through a 1 micron cartridge filter to give a stable magenta dispersion.

Magenta Example 4

C.I. Pigment Red 202/C.I. Pigment Violet 19 Dispersion with 1.5 Sulfonamide Dispersant 300.75 g of a magma prepared analogously as described in Magenta Example 3 having a pigment content of 6.65% of a 35:65 mixture of C.I. Pigment Red 202: C.I. Pigment Violet 19 was mixed in a lab kneader. 13 g of diethylene glycol was added, followed by addition of 10.85 g of the product of Magenta Example 2. The mixture was stirred for one hour and then discharged. This process was repeated. The combined magmas were stirred in 2 L of isopropanol using an overhead stirrer and IKA T25 Ultraturrax rotor-stator mixer until the magma was fully dispersed. The slurry was filtered, washing with 2 L of additional isopropanol. The filter cake was reslurried in 2.5 L of tap water and 25 g of 36.5% HCl. The mixture was heated to 90° C. for 1 hour, then filtered, washing with 16 L of tap water. The cake was reslurried in deionized water, stirred for 1 hour, then filtered, washing with more deionized water until the conductivity of the filtrate was equal to that of the deionized wash water, then dried in a vacuum oven at 80° C. overnight. Yield was 51.4 g.

45 grams of the above material was mixed with 292 g of Isopar®-L from ExxonMobil and 12.69 g of polymeric hydroxylated stearamide. 1900 g of 1 mm ceramic media was charged and the mixture was shaken for two hours on a paint shaker. The media was strained out with a sieve, and the dispersion was filtered through a 1 micron cartridge filter to give a stable magenta dispersion.

Black Example 1

A salt attrition process was performed in a laboratory kneader charged with 180 g of salt (sodium chloride), 30 g of OPDA (ortho-phenylenediamine perylene) pigment crude, 33 g of diethylene glycol and 44 g of Dispersant CuPc-$(SO_3H)_{1.3}(SO_2NH\text{-polymer})_{1.0}$ (throughout the examples the polymer structure was Kerocom® O3 (i.e., Kerocom® PIBA) BASF Corp, Mw about 1500, Mn about 1000) mixed with Magie oil 47 (solids content 60%) was added and mixed for 10 hours. The mixture was discharged and slurried in 1 L of isopropanol then filtered. The wet filter cake was slurried in 1 L of water adjusted to pH of 1 with 36.5% HCl and stirred at 90° C. for 15 minutes. The slurry was filtered and washed with additional tap water until the pH of the filtrate became neutral and the conductivity matched that of the wash water. The wet filter cake was slurried in 1 L of deionized water and then filtered and washed until the conductivity of the filtrate was the same as the deionized wash water. The product was then dried in an oven overnight at 75° C.

The dried material, 47 g, was powdered using a mortar and pestle and combined with 253 g of Isopar® L and 500 g of 1 mm ceramic media and shaken for 1 hr on a paint shaker. An additional 15 g of dispersant CuPc-$(SO_3H)_{1.3}(SO_2NH\text{-polymer})_{1.0}$ (solids content 60%) was added and the material shaken for 4 hours on a paint shaker. The media was removed and the resulting dispersion was filtered through a 1.0 micron cartridge filter.

Black Example 2

A laboratory kneader was charged with 180 g of salt, 30 g of OPDA pigment crude, 40 g of dispersant CuPc-$(SO_3H)_{1.8}(SO_2NH\text{-polymer})_{1.0}$ (solids content 72% in Magie oil 47) and 26 g of diethylene glycol and mixed for 11 hours. The mixture was discharged and slurried in 1 L of isopropanol then filtered. The wet filter cake was slurried in 1 L of water adjusted to pH of 1 with 36.5% HCl and stirred at 90° C. for 1 hour. The slurry was filtered and washed with additional tap water until the pH of the filtrate became neutral and the conductivity matched that of the wash water. The wet filter cake was slurried in 1 L of deionized water and then filtered and washed until the conductivity of the filtrate was the same as the deionized wash water. The product was then dried in an oven overnight at 75° C.

The dried material, 50 g, was combined with 250 g of Isopar® L and 600 g of 1 mm ceramic media and shaken for 2 hours on a paint shaker. An additional 9 g of dispersant CuPc-$(SO_3H)_{1.8}(SO_2NH\text{-polymer})_{1.0}$ (solids content 72%) was added and the material shaken for 4 hours on a paint shaker. The media was removed and the resulting dispersion was filtered through a 1.0 micron cartridge filter.

Color Measurement

The colored fluids were diluted to 2% pigment for cyan and 3% pigment for black and magenta in Isopar® L and placed in a 10 micron clear spacer to measure color and scatter. The fluid filled cell was placed over the white portion of a byko PA-2810 card and the color (L*, a* & b*) measured for D50/2° on a X-Rite SpectraEye 45/0 colorimeter. The fluid filled cell was placed over the black portion of a byko PA-2810 card and the scatter, a measure of transparency by the method provided in U.S. Pat. No. 7,839,501, which is hereby incorporated in its entirety, was measured on a Datacolor Spectraflash SF600. The colored fluids were diluted to 0.1% pigment with Isopar® L to measure the particle size (represented by D50) and particle size distribution (represented by D5 & D95) on a Malvern Zetasizer Nano ZS.

TABLE III

| Example # | L* | a* | b* | D5 | D50 | D95 | Scatter |
|---|---|---|---|---|---|---|---|
| Cyan example 3 (comparative) | 68 | −44 | −28 | 59 | 154 | 490 | 2.63 |
| Cyan example 4 (comparative) | 67 | −47 | −30 | 68 | 196 | 654 | 2.33 |
| Cyan example 5 | 65 | −40 | −35 | 50 | 116 | 280 | 2.18 |
| Cyan example 6 | 59 | −53 | −41 | 54 | 179 | 374 | 3.21 |
| Cyan example 7 | 58 | −54 | −43 | 37 | 131 | 337 | 3.80 |
| Cyan example 8 | 60 | −54 | −41 | 64 | 152 | 390 | 3.74 |
| Cyan example 9 | 58 | −53 | −46 | 43 | 87 | 189 | 2.40 |
| Cyan example 10 | 57 | −54 | −42 | 46 | 162 | 536 | 1.96 |
| Cyan example 11 | 57 | −54 | −42 | 35 | 90 | 245 | 2.89 |
| Cyan example 12 | 58 | −55 | −41 | 45 | 144 | 351 | 2.56 |
| Cyan example 13 | 57 | −53 | −45 | 39 | 80 | 170 | 2.47 |
| Cyan example 14 | 57 | −55 | −41 | 60 | 117 | 233 | 4.77 |
| Cyan example 15 | 57 | −53 | −43 | 27 | 123 | 246 | 3.30 |
| Cyan example 16 (comparative) | 56 | −53 | −43 | 50 | 104 | 222 | 3.21 |
| Cyan example 17 | 58 | −53 | −45 | 41 | 93 | 237 | 3.65 |
| Cyan example 18 (comparative) | 59 | −52 | −44 | 45 | 95 | 205 | 3.96 |
| Cyan example 19 | 58 | −52 | −46 | 33 | 97 | 239 | 4.34 |
| Cyan example 20 | 57 | −53 | −44 | 60 | 155 | 334 | 4.03 |
| Cyan example 21 | 58 | −57 | −40 | 69 | 134 | 347 | 4.40 |
| Cyan example 22 | 57 | −56 | −42 | 38 | 89 | 220 | 3.55 |
| Cyan example 23 (comparative) | 57 | −56 | −43 | 41 | 86 | 192 | 3.65 |
| Cyan example 24 | 56 | −55 | −40 | 61 | 144 | 367 | 4.21 |
| Cyan example 25 | 56 | −56 | −42 | 51 | 99 | 201 | 3.65 |
| Cyan example 26 | 59 | −52 | −39 | 69 | 178 | 675 | 4.07 |
| Cyan example 27 | 59 | −55 | −39 | 53 | 102 | 208 | 3.16 |
| Cyan example 28 | 59 | −57 | −40 | 61 | 113 | 214 | 3.53 |
| Magenta example 3 | 52 | 59 | −26 | 53 | 116 | 247 | 2.14 |
| Magenta example 4 | 52 | 68 | −23 | 56 | 105 | 196 | 2.73 |
| Black example 1 | 2.6 | 1.7 | −4.0 | 32 | 104 | 310 | — |
| Black example 2 | 2.4 | 1.3 | −3.1 | 38 | 102 | 288 | — |

Those skilled in the art having the benefit of the teachings of the present disclosure as hereinabove set forth, can effect numerous modifications thereto. These modifications are to be construed as being encompassed within the scope of the appended claims.

What is claimed is:

1. A colored fluid for use in a display device comprising:
at least one first pigment;
at least one non-polar solvent;
at least one polymeric dispersant comprising the formula:

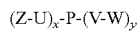

(Z-U)$_x$-P-(V-W)$_y$ wherein P is a residue of a second pigment;
each Z is independently a non-polar polymer;
each U and V are not polymeric and independently selected from R, RC(O)O, ROC(O), RC(O)NR$_1$, RNR$_1$C(O), RSO$_2$NR$_1$, RSO$_3$, ROSO$_3$, RSO$_2$, RO, RS, RNR$_1$, =N—, RNHC(O)NR$_1$, RNHC(O)O, ROC(O)NH, RC(O)OCH$_2$CH(OH)CH$_2$, ROCH$_2$CH(OH)CH$_2$, RNR$_1$CH$_2$CH(OH)CH$_2$, RPO(OR$_1$)O, ROPO(OR$_1$)O, and anionic forms thereof, where R is independently selected from a single bond, alkyl, aryl, alkylaryl, or a heterocycle, and each R$_1$ is independently selected from H, alkyl, aryl, or alkylaryl, provided that there is at least one V-W that is not a single bonded hydrogen;
each W is not polymeric and independently selected from H, OH, SH, alkyl, aryl, alkylaryl, ammonium, alkylammonium, arylammonium, alkali metal, and alkaline earth metal;
wherein each V-W bond is a covalent or ionic bond;
x is an integer greater than or equal to 1, and y is an integer greater than or equal to 1; and
wherein for the colored fluid, at least one polymeric dispersant comprises an ionic (V-W) moiety.

2. The colored fluid of claim 1, wherein the ionic (V-W) moiety is in the acid form.

3. The colored fluid of claim 1, wherein P is selected from azo or azo condensed compounds, metal complexes, benzimidazolones, azomethines, cyanines, azacarbocyanines, enamines, hemicyanines, streptocyanines, styryls, zeromethines, mono-, di-, tri-, and tetraazamethine, carotenoids, diarylmethanes, triarylmethanes, xanthenes, thioxanthenes, flavonoids, stilbenes, coumarins, acridines, fluorenes, fluoroses, benzodifuranones, formazans, pyrazoles, thiazoles, azines, diazines, oxazines, dioxazines, triphenodioxazines, phenazines, thiazines, oxazones, hydroquinones, naphthaquinones, anthraquinones, rhodamines, phthalocyanines, neutrocyanines, diazahemicyanines, porphyrins, perinones, perylenes, pyronins, diketopyrrolopyrroles, indigo, indigoids, thioindigo, indophenols, naphthaliinides, isoindolines, isoindolinones, iminoisoindolines, iminoisoindolinones, quinacridones, flavanthrones, indanthrones, anthrapyrimidines, quinophthalones, isoviolanthrones, pyranthrones, and any combinations thereof.

4. The colored fluid of claim 1, wherein the first pigment is a copper phthalocyanine selected from C.I. Pigment Blue 15:3, C. I. Pigment Blue 15:4, and mixtures thereof.

5. The colored fluid of claim 1, wherein P comprises a copper phthalocyanine and Z comprises a polyalkylene polymer.

6. The colored fluid of claim 1, wherein P comprises a copper phthalocyanine and Z comprises a polyisobutylene polymer.

7. The colored fluid of claim 1, wherein P comprises a copper phthalocyanine, the (V-W) moiety comprises a sulfonic acid moiety, and Z comprises a polyisobutylene polymer.

8. The colored fluid of claim 1, wherein P comprises a copper phthalocyanine, the (V-W) moiety comprises a free sulfonic acid moiety, and Z comprises a polyisobutylene polymer.

9. The colored fluid of claim 1, wherein x is from 1 to 5 and y is from 1 to 5.

10. The colored fluid of claim 1, wherein x is from 1 to 2 and y is from 1 to 2.

11. The colored fluids of claim 1, wherein there is more than one polymeric dispersant comprising the formula:

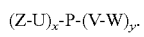

(Z-U)$_x$-P-(V-W)$_y$.

12. A process for preparing the colored fluid of claim 1, comprising the steps of:
i. providing a first pigment,
ii. providing a polymeric dispersant,
iii. performing a dispersion process to generate the colored fluid as a pigment dispersion from the first pigment, the polymeric dispersant, and a non-polar solvent.

13. The process of claim 12, wherein the process additionally comprises the step of performing a pigmentation process to prepare the first pigment, wherein the polymeric dispersant is mixed with the pigment during the pigmentation process.

14. The process of claim 12, wherein the polymeric dispersant is added to the first pigment and the non-polar solvent during the dispersion process.

15. The process of claim 13, wherein the pigmentation process is a salt attrition of a copper phthalocyanine crude.

16. The process of claim 12, wherein the particle size of the first pigment has a $D_{50}$ of from about 10 nm to about 300 nm.

* * * * *